United States Patent
Nadarajah et al.

(10) Patent No.: US 10,534,730 B1
(45) Date of Patent: Jan. 14, 2020

(54) STORING MICROCODE FOR A VIRTUAL FUNCTION IN A TRUSTED MEMORY REGION

(71) Applicant: ATI TECHNOLOGIES ULC, Markham (CA)

(72) Inventors: Kathirkamanathan Nadarajah, Markham (CA); Anthony Asaro, Markham (CA)

(73) Assignee: ATI Technologies ULC, Markham (CA)

(*) Notice: Subject to any disclaimer, the term of this patent is extended or adjusted under 35 U.S.C. 154(b) by 0 days.

(21) Appl. No.: 16/228,360

(22) Filed: Dec. 20, 2018

(51) Int. Cl.
*G06F 13/16* (2006.01)
*G06F 3/06* (2006.01)
*G06F 9/455* (2018.01)

(52) U.S. Cl.
CPC ........ *G06F 13/1668* (2013.01); *G06F 3/0604* (2013.01); *G06F 3/0659* (2013.01); *G06F 3/0673* (2013.01); *G06F 9/45558* (2013.01); *G06F 2009/45579* (2013.01); *G06F 2009/45583* (2013.01)

(58) Field of Classification Search
CPC .. G06F 13/1668; G06F 3/0604; G06F 3/0659; G06F 3/0673; G06F 9/45558; G06F 2009/45579; G06F 2009/45583
See application file for complete search history.

(56) References Cited

U.S. PATENT DOCUMENTS

| | | | |
|---|---|---|---|
| 2005/0144476 A1* | 6/2005 | England | G06F 9/4405 726/17 |
| 2016/0259750 A1* | 9/2016 | Keidar | G06F 9/45558 |
| 2017/0288874 A1* | 10/2017 | Narendra Trivedi | H04L 9/3234 |

* cited by examiner

*Primary Examiner* — Henry Tsai
*Assistant Examiner* — John B Roche

(57) ABSTRACT

A first processor that has a trusted relationship with a trusted memory region (TMR) that includes a first region for storing microcode used to execute a microcontroller on a second processor and a second region for storing data associated with the microcontroller. The microcontroller supports a virtual function that is executed on the second processor. An access controller is configured by the first processor to selectively provide the microcontroller with access to the TMR based on whether the request is to write in the first region. The access controller grants read requests from the microcontroller to read from the first region and denies write requests from the microcontroller to write to the first region. The access controller grants requests from the microcontroller to read from the second region or write to the second region.

20 Claims, 7 Drawing Sheets

STORING MICROCODE FOR A VIRTUAL FUNCTION IN A TRUSTED MEMORY REGION

BACKGROUND

A conventional memory model for a virtual machine includes a trusted memory region (TMR) that is used to store information that is only accessible by trusted entities in the processing system. For example, the processing system includes a high-security processor that operates at a high privilege level and is considered a most trusted entity in the processing system. The high-security processor is authorized to read, write, and modify information in the TMR. In the virtual environment implemented on the processor, a hypervisor manages one or more guests that are executing on one or more virtual machines. The hypervisor is a trusted entity that is used to authorize and load guests, as well as functions that are used by the guests such as graphics, media, encoders, decoders, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
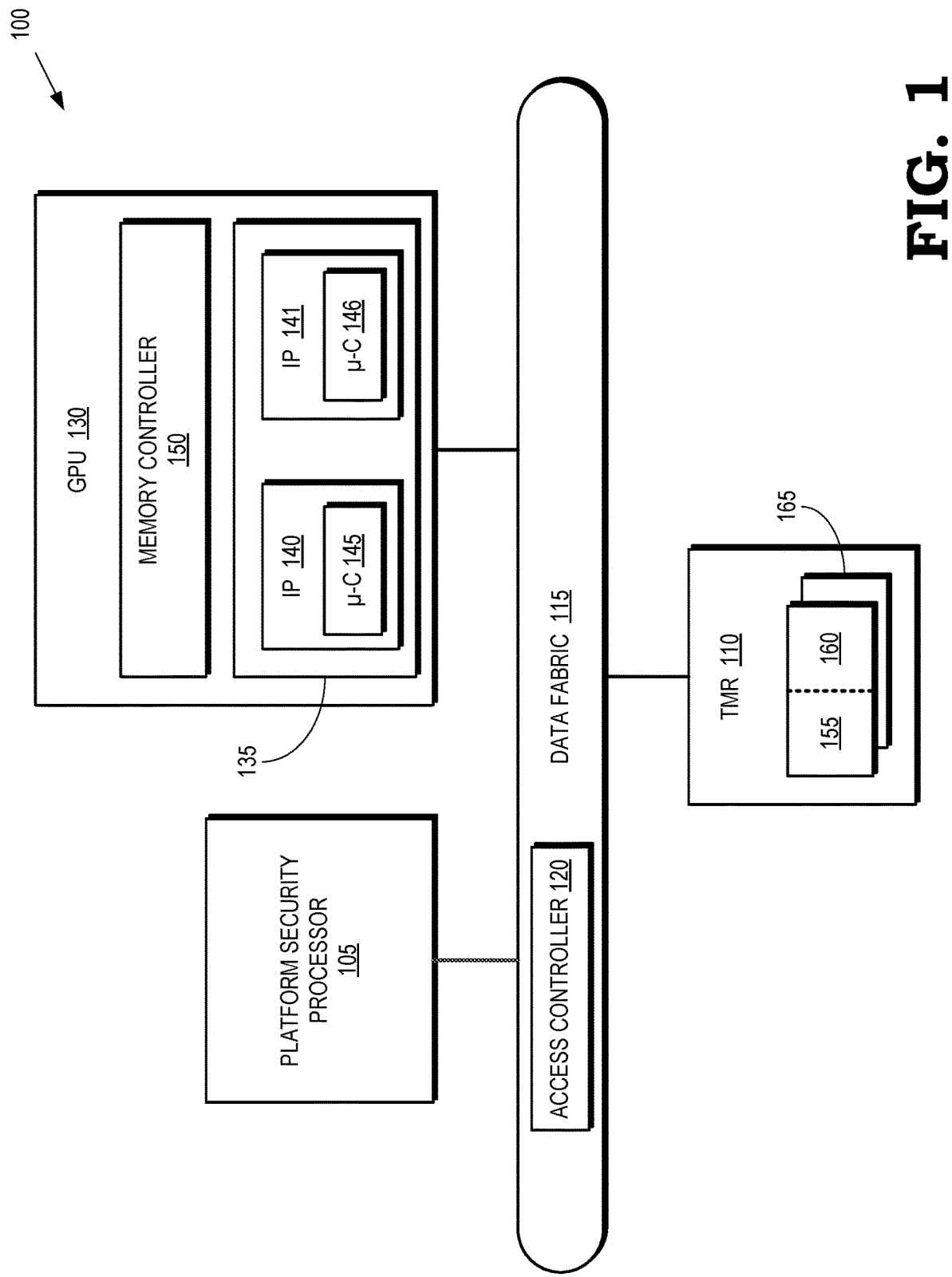
FIG. 1 is a block diagram of a processing system that provides hardware hardened protection of microcode that supports virtual functions according to some embodiments.

Processing units such as graphics processing units (GPUs) support virtualization that allows multiple virtual machines to use the hardware resources of the GPU. Some virtual machines implement an operating system that allows the virtual machine to emulate an actual machine. Other virtual machines are designed to execute code in a platform-independent environment. A hypervisor creates and runs the virtual machines, which are also referred to as guest machines or guests. The virtual environment implemented on the GPU also provides virtual functions to other virtual components implemented on a physical machine. A single physical function implemented in the GPU is used to support one or more virtual functions. The physical function allocates the virtual functions to different virtual machines in the physical machine on a time-sliced basis. For example, the physical function allocates a first virtual function to a first virtual machine in a first time interval and a second virtual function to a second virtual machine in a second, subsequent time interval. In some cases, a physical function in the GPU supports as many as thirty-one virtual functions. The single root input/output virtualization (SR IOV) specification allows multiple virtual machines to share a GPU interface to a single bus, such as a peripheral component interconnect express (PCI Express) bus. Components access the virtual functions by transmitting requests over the bus.

Microcontrollers that are implemented in a processing unit (such as a GPU) use firmware to implement microcode for executing the functions used by guests executing on virtual machines that are supported by the processing unit. The microcode is stored in an internal memory in the microcontroller or in an external memory that is accessible by the microcontroller. Even though the microcode is initially authenticated before it is loaded into the internal or external memory associated with the microcontroller, the microcode can subsequently modify (e.g., maliciously tamper with) other code or register values stored in the internal or external memories. For example, the microcode can modify the firmware used to implement functions that are shared by multiple guests. A guest that subsequently executes the modified function can therefore cause unexpected or undesirable behavior of the processing system.

In order to enforce isolation between (and among) the microcode executed by a guest and virtual functions that are shared by multiple guests, FIGS. 1-7 disclose a trusted memory region (TMR) that is partitioned into two portions according to some embodiments. The two portions include: (1) a code TMR that is used to store read-only, non-modifiable information such as the microcode or firmware used to implement functions that are shared by multiple guests and (2) a data TMR that can be read and modified by the microcode. For example, the data TMR is used to store program data, a heap, a stack, or other types of information that are read, modified, and written by the microcode during execution. Different types of operations or data are tagged with different identifiers to indicate whether they are associated with the data TMR or the code TMR. For example, an instruction fetch operation is tagged with one client unit identifier to indicate that the fetch operation is only permitted to access the code TMR and cannot access the data TMR. For another example, data accesses are tagged with another client unit identifier to indicate that the data access is only permitted to access the data TMR and cannot access the code TMR.

FIG. 1 is a block diagram of a processing system 100 that provides hardware hardened protection of microcode that supports virtual functions according to some embodiments. The processing system 100 includes a high security processor such as a platform security processor 105 that acts as a hardware root of trust for devices in the processing system 100. The platform security processor 105 has a trusted relationship with a memory region 110. The memory region 110 is therefore referred to as a trusted memory region (TMR) 110. The trust relationship is established between the platform security processor 105 and the TMR 110 using techniques such as handshaking protocols, authentication protocols, key exchange, hardware isolation, and the like. Some embodiments of the TMR 110 are a common core that is part of a physical function space.

The platform security processor 105 exchanges information with the TMR 110 via a data fabric 115 implemented in the processing system 100. Some embodiments of the data fabric 115 include an associated infrastructure to support an interface between the platform security processor 105 and the TMR 110. The associated infrastructure can include one or more buses, bridges, switches, routers, wires, traces, and the like. The data fabric 115 provides secure communication between the platform security processor 105 and the TMR 110 due to the trusted relationship between these entities. Some embodiments of the data fabric 115 include a fixed function hardware block (also referred to herein as "an IP") 120 that controls access to the TMR 110 based on configuration information provided by the platform security processor 105. The IP 120 is therefore referred to herein as an access controller 120. The access controller 120 grants read, write, and modify requests from the platform security processor 105 to the TMR 110.

The processing system 100 includes one or more graphics processing units (GPUs) 130 that render images for presentation on a display (not shown in FIG. 1 in the interest of clarity) in the present embodiment. For example, the GPU 130 can render objects to produce values of pixels that are provided to the display, which uses the pixel values to display an image that represents the rendered objects. The GPU 130 includes a GPU core 135 that is made up of a set of compute units, a set of fixed function units, or a combination thereof for executing instructions concurrently or in parallel. The GPU core 135 includes tens, hundreds, or thousands of compute units for executing instructions. In the illustrated embodiment, the GPU core 135 includes one or more fixed function hardware units (IP) 140, 141 that support one or more virtual functions, as discussed herein. The IP 140, 141 also include corresponding microcontrollers 145, 146 that execute microcode to support the virtual functions and corresponding virtual machines. The GPU 130 also includes a memory controller 150 that supports communication between the GPU 130 and the TMR 110.

The TMR 110 stores information associated with the microcontroller 145 in either a read-only code region 155 or a read-write data region 160. The microcode used to implement the microcontroller 145 is stored in the code region 155 of the TMR 110. Some embodiments of the platform security processor 105 load microcode into the code region 155 in response to the GPU 130 launching a virtual function associated with the microcontroller 145. Some embodiments of the platform security processor 105 authenticate the microcode before storing the microcode in the code region 155. For example, the platform security processor 105 stores the microcode in response to successfully authenticating the microcode. The code region 155 is read-only in order to prevent the microcode from subsequently modifying (e.g., maliciously tampering with) other code or register values stored in the code region 155.

Some embodiments of the platform security processor 105 configure the access controller 120 to grant read requests from the microcontroller 145 to the code region 155 and deny write requests to the code region 155. The data region 160 is configured for read-write access to provide a region that is used by the microcontroller 145 for reading, writing, or modifying information without making the code region 155 vulnerable to inadvertent or malicious modifications. The platform security processor 105 configures the access controller 120 to grant read or write requests from the microcontroller 145 to the data region 160. The code region 155 and the data region 160 are further partitioned into sub-regions that correspond to guest virtual machines that use virtual functions provided by the IP 140 associated with the microcontroller 145, as illustrated below in FIG. 5. The TMR 110 also includes a corresponding code TMR and data TMR (collectively indicated by the reference numeral 165) for the microcontroller 146. Some embodiments of the microcontrollers 145, 146 directly access the TMR 110. For example, an address of the read-only code region 155 or the read-write data region 160 is supplied by the platform security processor 105 and not determined via mapping functionality of a virtual machine in the GPU 130.

Figure 2:
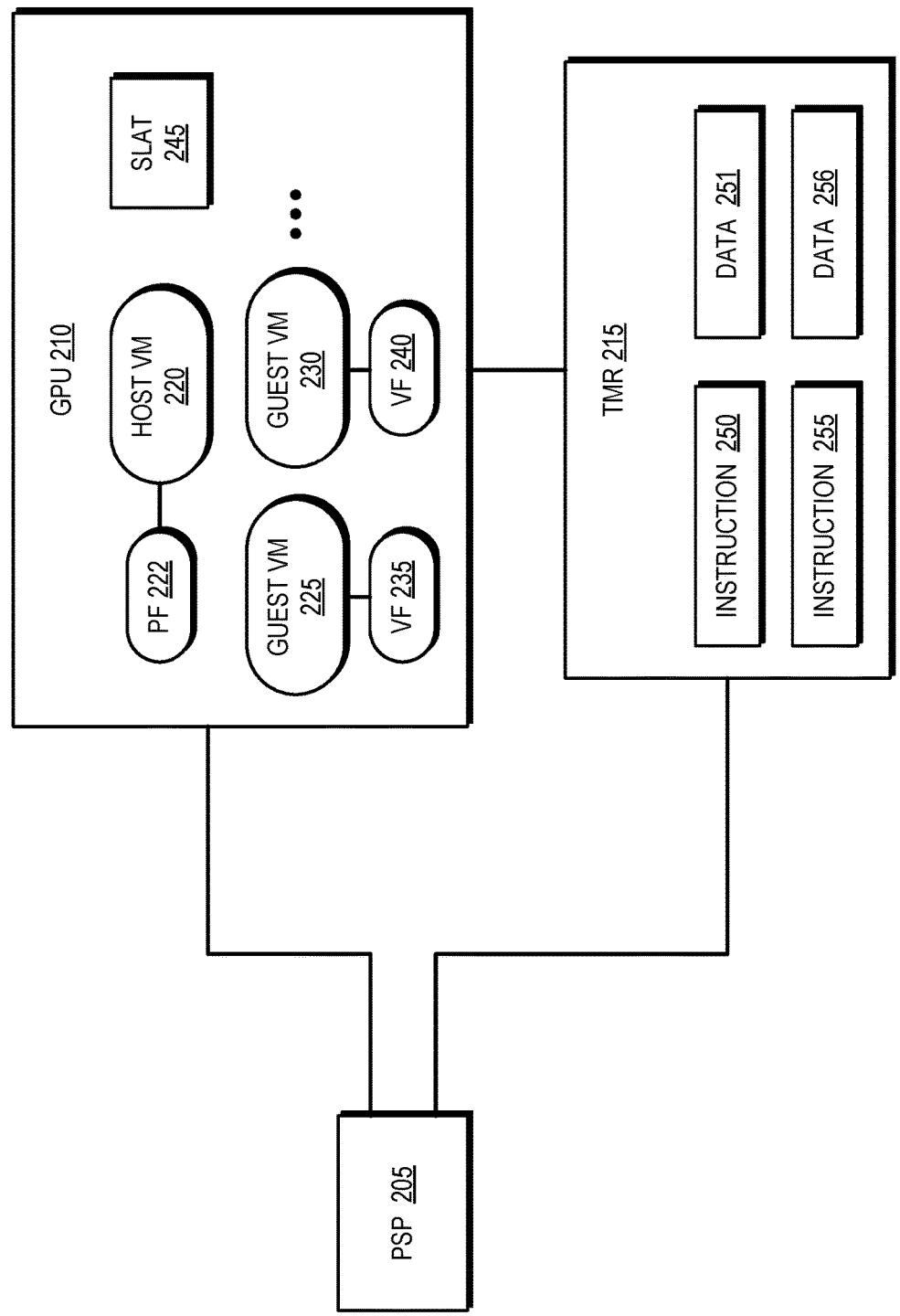
FIG. 2 is a block diagram of a processing system that implements virtual machines that are mapped to virtual functions according to some embodiments.

FIG. 2 is a block diagram of a processing system 200 that implements virtual machines that are mapped to virtual functions according to some embodiments. The processing system 200 includes a platform security processor (PSP) 205, a GPU 210, and a TMR 215. The processing system 200 is therefore used to implement some embodiments of the processing system 100 shown in FIG. 1 and the PSP 205, the GPU 210, and the TMR 215 operate in a manner that is the same or similar to operation of the platform security processor 105, the GPU 130, and the TMR 110 shown in FIG. 1.

The GPU 210 supports virtualization and, in the illustrated embodiment, the GPU 210 implements a host virtual machine (VM) 220 and one or more guest VMs 225, 230. Although two guest VMs 225, 230 are shown in FIG. 2, some embodiments of the GPU 210 implement more or fewer VM and the number of VM changes dynamically in response to changing processing requirements for the GPU 210. Privileged software running on the host VM 220 partitions the physical address space in the TMR 215 and allocates portions of the physical address space of the TMR 215. Some embodiments of the host VM 220 partition frame buffer memory using offset and size attributes that define the different partitions. The host VM 220 implements physical functions (PF) 222 that are used to allocate one or more virtual functions 235, 240 to the corresponding guest VMs 225, 230. Some embodiments of the virtual functions 235, 240 operate in a zero-based frame buffer memory partition that is allocated to the virtual functions 235, 240 by the host VM 220. The frame buffer memory partitions allocated to the different virtual functions 235, 240 are isolated from each other by hardware using base and size registers on the physical function. For example, access to the TMR 215 can be controlled by second level address translation (SLAT) circuitry 245, which is implemented in some embodiments of the memory controller 150 shown in FIG. 1.

The portions of the TMR 215 that are allocated to the guest VMs 225, 230 to store information associated with the virtual functions 235, 240 are further subdivided into read-only instruction portions and read-write data portions. In the illustrated embodiment, the portion of the TMR 215 that is allocated to the guest VM 225 includes an instruction portion 250 and a data portion 251 and the portion of the TMR 215 that is allocated to the guest VM 230 includes an instruction portion 255 and a data portion 256.

The GPU 210 implements microcontrollers (not shown in FIG. 2 in the interest of clarity) such as the microcontrollers 145, 146 shown in FIG. 1 to execute microcode to support the virtual functions 235, 240 and the corresponding guest VMs 225, 230. The microcode used to implement the microcontrollers associated with the guest VMs 225, 230 is stored in the instruction portions 250, 255. A first microcontroller associated with the guest VM 225 and the virtual function 235 is restricted to read-only access to the instruction portion 250. The first microcontroller associated with the guest VM 225 and the virtual function 235 is given read-write access to the data portion 251. A second microcontroller associated with the guest VM 230 and the virtual function 240 is restricted to read-only access to the instruction portion 255. The second microcontroller associated with the guest VM 230 and the virtual function 240 is given read-write access to the data portion 256.

Figure 3:
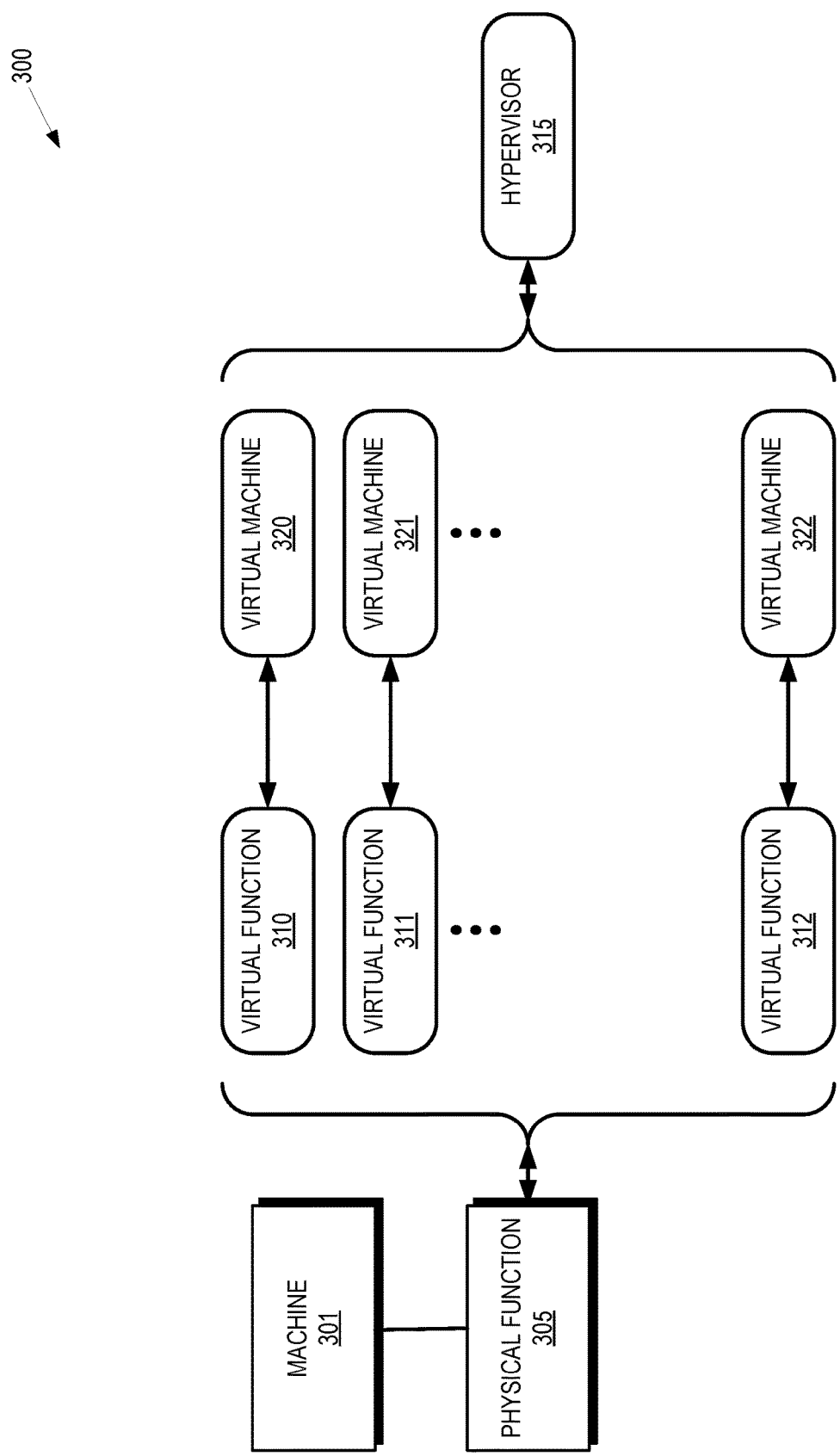
FIG. 3 is a block diagram of a mapping of virtual functions to virtual machines implemented in a processing unit according to some embodiments.

FIG. 3 is a block diagram of a mapping 300 of virtual functions to virtual machines implemented in a processing unit according to some embodiments. The mapping 300 represents a mapping of virtual functions to virtual machines implemented in some embodiments of the GPU 130 shown in FIG. 1 and the GPU 210 shown in FIG. 2. A machine 301 is connected to a physical function 305 such as a GPU that is partitioned into virtual functions 310, 311, 312 during initialization of the physical function 305. The virtual functions 310-312 represent some embodiments of the virtual functions 235, 240 shown in FIG. 2.

The machine 301 implements a host operating system or a hypervisor 315 for the physical function 305, such as the host VM 220 shown in FIG. 2. Some embodiments of the physical function 305 support up to thirty-one virtual functions 310-312, although other embodiments of the physical function 305 support more or fewer virtual functions. The hypervisor 315 launches one or more virtual machines 320, 321, 322 for execution on a physical resource such as the GPU that supports the physical function 305. The virtual machines 320-322 are assigned to a corresponding virtual function 310-312. In the illustrated embodiment, the virtual machine 320 is assigned to the virtual function 310, the virtual machine 321 is assigned to the virtual function 311, and the virtual machine 322 is assigned to the virtual function 312. The virtual functions 310-312 then serve as the GPU and provide all of the GPU functionality to the corresponding virtual machines 320-322. The virtualized GPU is therefore shared across many virtual machines 320-322. In some embodiments, time slicing and context switching are used to provide fair access to the virtual function 310-312.

Figure 4:
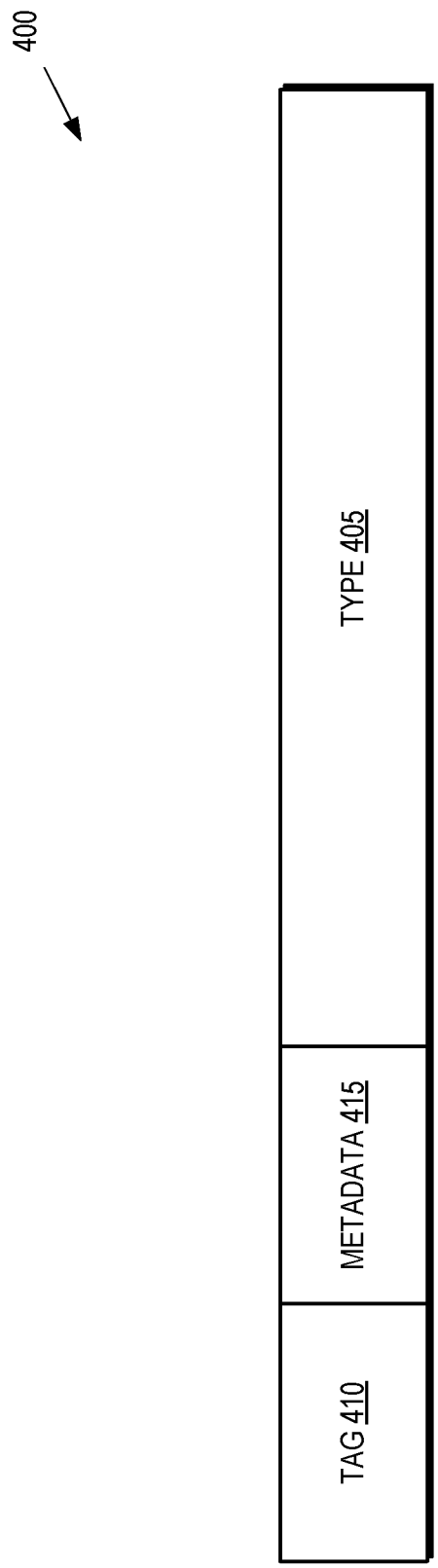
FIG. 4 is a block diagram of an instruction that is serviced using a read-only or a read-write portion of a trusted memory region (TMR) according to some embodiments.

FIG. 4 is a block diagram of an access request 400 that is serviced using a read-only or a read-write portion of a TMR according to some embodiments. The access request 400 is processed in some embodiments of the GPU 130 shown in FIG. 1 and the GPU 210 shown in FIG. 2. A first portion of the access request 400 is used to indicate the type 405 of the access request 400. The access request 400 also includes a tag 410 and metadata 415 that indicate whether the access request 400 is associated with a read-only or read-write portion of a TMR. As discussed herein, TMR accesses are controlled based on an identifier of a client unit that is trying to make the access, e.g., an identifier of a microcontroller, and the type of access requested by the client unit, e.g., read or write. A code TMR such as the code TMR 155 shown in FIG. 1 is configured for read-only access by a client unit having an identifier associated with the code TMR, which is used to tag instruction fetches. A data TMR such as the data TMR 160 shown in FIG. 1 is configured for read-write access by a client unit having an identifier associated with the data TMR, which is used to tag access requests that read, write, or modify data in the data TMR. The identifiers for the code TMR and the data TMR are different to allow an access controller such as the access controller 120 shown in FIG. 1 to distinguish between the different access types.

In some embodiments, hardware circuitry tags an instruction fetch issued by a microcontroller such as the microcontroller 145 shown in FIG. 1 with a first client unit identifier. For example, the value of the tag 410 for the instruction fetch is set to the first client identifier. The hardware circuitry tags a data read request issued by the microcontroller with a second client unit identifier. For example, the value of the tag 410 for the data read request is set to the second client identifier. The first client unit identifier is associated with a code TMR and the second client unit identifier is associated with a data TMR. The access controller subsequently evaluates the requests based on the tag 410. For example, if the tag 410 includes the first client unit identifier to indicate the code TMR, the access controller only allows the access request if the type 405 is a read access. No write accesses are permitted so that the code TMR cannot be modified. For another example, if the tag 410 includes the second client unit identifier, the access controller does not allow the access request if the type 405 indicates an instruction fetch. Thus, instruction fetches cannot target the data TMR, which prevents modifiable data being executed as an instruction.

For example, the GPU executes the fetch operation 405 to read information from the read-write portion of the TMR if the tag 410 and the metadata 415 of the fetch operation 405 indicate that the fetch operation 405 is directed to the read-write portion of the TMR.

Figure 5:
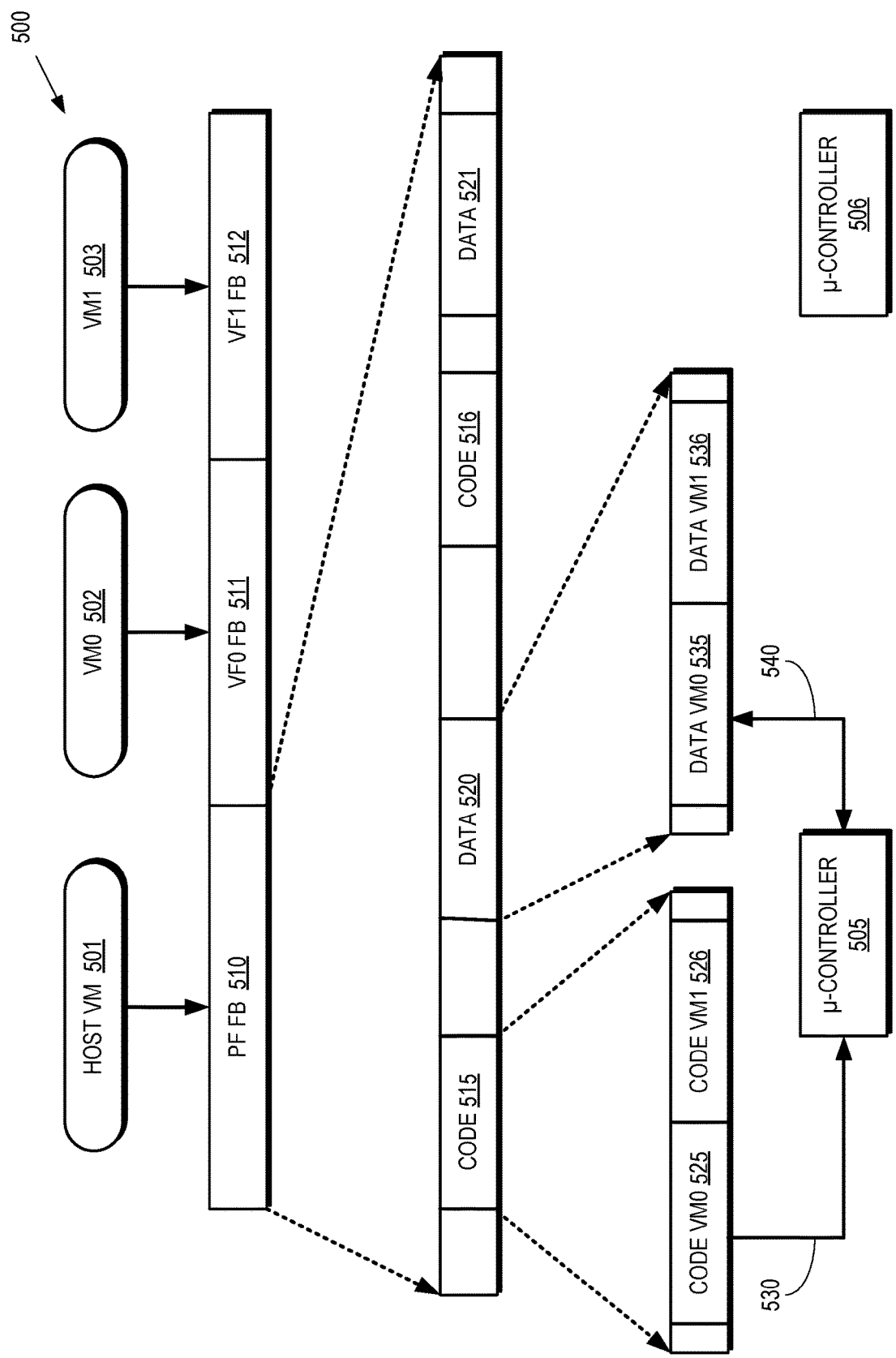
FIG. 5 is a block diagram of a data structure that illustrates a read-only TMR and a read-write TMR that are associated with different virtual functions according to some embodiments.

FIG. 5 is a block diagram of a data structure 500 that illustrates a read-only TMR and a read-write TMR that are associated with different virtual functions according to some embodiments. The data structure 500 is implemented in or associated with a processing unit such as some embodiments of the GPU 130 shown in FIG. 1 and the GPU 210 shown in FIG. 2. The processing unit supports virtualization and implements a host virtual machine (VM) 501 and two guest virtual machines (VM0, VM1) 502, 503, although more or fewer guest virtual machines are implemented in some embodiments of the processing unit. The processing unit that implements or is associated with the data structure 500 also implements microcontrollers 505, 506 that execute code, instructions, or operations to support the virtual machines 501-503. In the illustrated embodiment, the microcontroller 505 supports the guest virtual machines 502, 503 and the microcontroller 506 supports other virtual machines (not shown in FIG. 5 in the interest of clarity).

The host VM 501 is associated with a physical function that is stored in a frame buffer (PF FB) 510 of the TMR that stores the data structure 500. Virtual functions are allocated to the guest virtual machines 502, 503 and stored in corresponding frame buffers 511, 512. Code that is associated with or used to implement the microcontrollers 505, 506 is stored in read-only regions 515, 516 in the frame buffer 510 to prevent inadvertent or malicious modification of the code. In the illustrated embodiment, code associated with the microcontroller 505 is stored in the region 515 and code associated with the microcontroller 506 is stored in the region 516. Data that is associated with the microcontrollers 505, 506 is stored in read-write regions 520, 521 that are modifiable by the corresponding microcontrollers 505, 506. For example, the microcontroller 505 has read-write access to the data 520 and the microcontroller 506 has read-write access to the data 521.

The region 515 is used to store code associated with the guest virtual machines 502, 503 and the region 520 is used to store data associated with the guest virtual machines 502, 503. In the illustrated embodiment, a portion 525 of the region 515 stores code associated with the guest virtual machine 502 and a portion 526 of the region 515 stores code associated with the guest virtual machine 503. The microcontroller 505 is given read-only access to the portions 525, 526, as indicated by the single headed arrow 530. A portion 535 of the region 520 stores data associated with the guest virtual machine 502 and a portion 536 of the region 520 stores data associated with the guest virtual machine 503.

The microcontroller 505 is given read-write access to the portions 535, 536, as indicated by the double-headed arrow 540.

In some embodiments, the portions 525, 526 of the region 515 and the portions 535, 536 of the region 520 are identified by corresponding start addresses, end addresses, or address ranges. As discussed herein, access to the portions 525, 526 of the region 515 and the portions 535, 536 of the region 520 is controlled by an access controller such as the access controller 120 shown in FIG. 1. For example, the access controller can determine whether to provide read, write, or modify access to the microcontrollers 505, 506 based on addresses in the memory access requests and the start addresses, end addresses, or address ranges that define the regions 515, 520.

Figure 6:
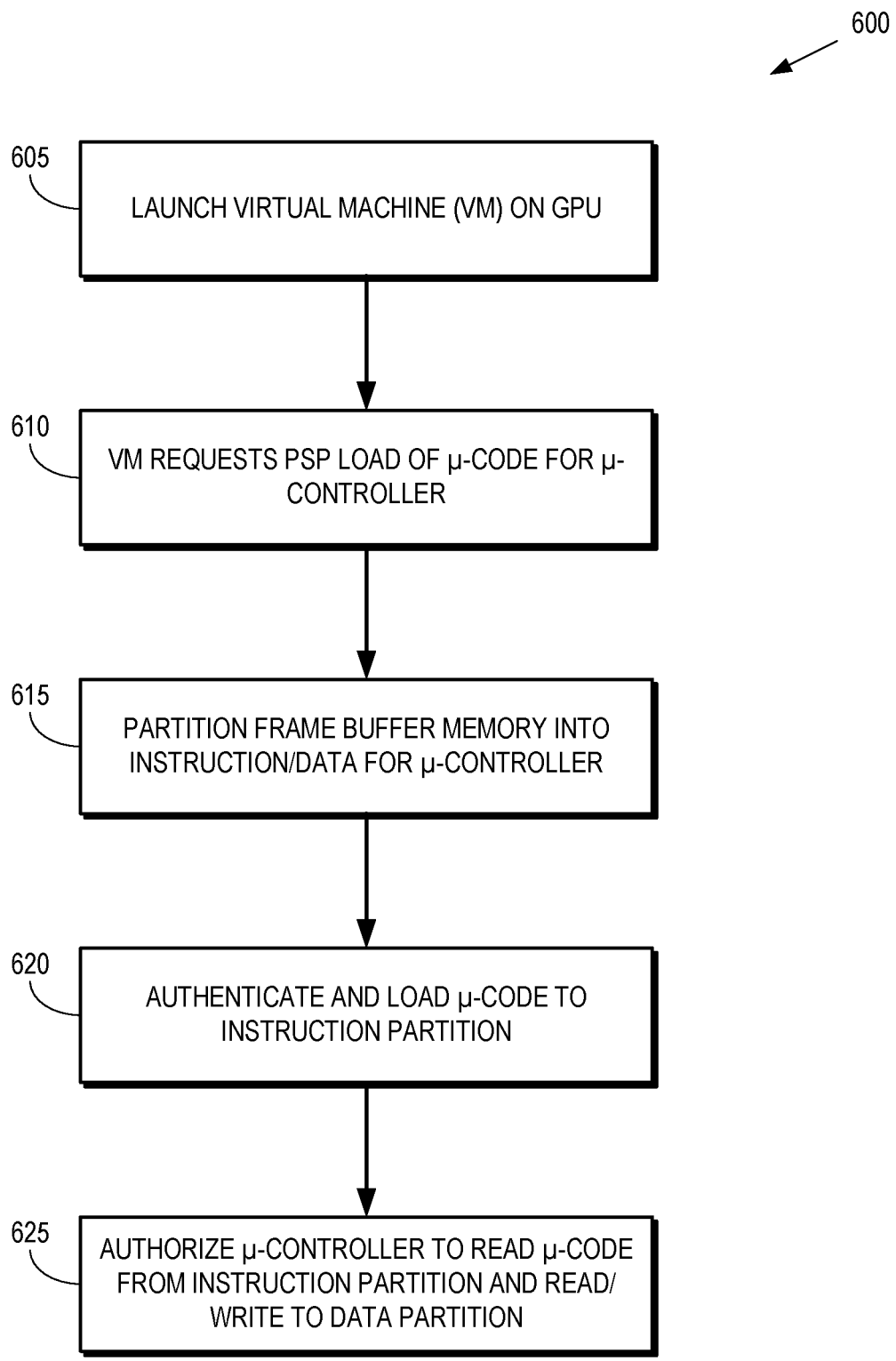
FIG. 6 is a flow diagram of a method for selectively providing a microcontroller with access to an instruction partition and a data partition in a TMR according to some embodiments.

FIG. 6 is a flow diagram of a method 600 for selectively providing a microcontroller with access to an instruction partition and a data partition in a TMR according to some embodiments. The method 600 is implemented in some embodiments of the GPU 130 shown in FIG. 1 and the GPU 210 shown in FIG. 2.

At block 605, a virtual machine is launched on the GPU, e.g., by a hypervisor. Launching the virtual machine includes associating the virtual machine with a virtual function that corresponds to a physical function implemented by the GPU.

At block 610, the virtual machine sends a request to a platform security processor (PSP) to load microcode for a microcontroller associated with the virtual machine. Some embodiments of the request include information identifying the virtual machine and the microcontroller. The platform security processor is implemented using some embodiments of the platform security processor 105 shown in FIG. 1 or the PSP 205 shown in FIG. 2.

At block 615, the platform security processor partitions frame buffer memory in a TMR into an instruction partition and a data partition that is used by the microcontroller.

At block 620, the platform security processor authenticates the microcode that is used by the microcontroller. In response to successfully authenticating the microcode, the platform security processor loads the microcode into the instruction partition of the TMR. If the platform security processor is unable to authenticate the microcode, the microcode is not installed in the instruction partition.

At block 625, the platform security processor authorizes the microcontroller to read the microcode from the instruction partition by giving the microcontroller read-only access to the instruction partition. The platform security processor also authorizes the microcontroller to modify information stored in the data partition by giving the microcontroller read-write access to the data partition. The microcontroller can therefore read or write program data, a heap, a stack, or other types of information in the data partition.

Figure 7:
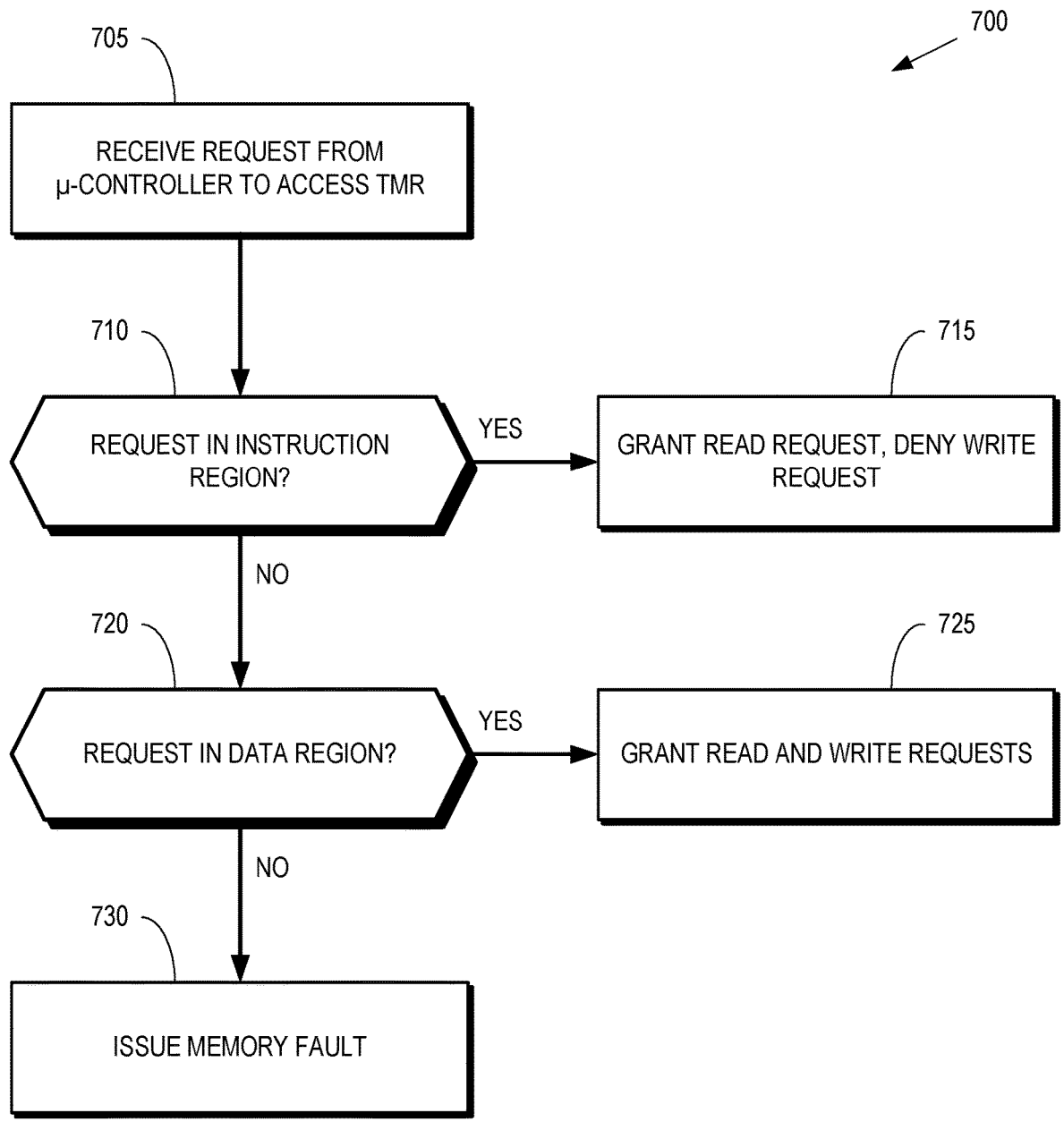
FIG. 7 is a flow diagram of a method of controlling access to instruction and data regions in a TMR according to some embodiments.

FIG. 7 is a flow diagram of a method 700 of controlling access to instruction and data regions in a TMR according to some embodiments. The method 700 is implemented in some embodiments of the access controller 120 shown in FIG. 1.

At block 705, the access controller receives a request from a microcontroller to access information stored in a TMR. The request includes information indicating an operation (such as a fetch operation or a write or modify operation) and an address associated with the operation. In some embodiments, the request includes a tag or metadata that is used to identify a type of operation or a portion of the TMR, e.g., as shown the instruction 400 in FIG. 4.

At decision block 710, the access controller determines whether the request is directed to an address that is in an instruction region that is configured for read-only access by the microcontroller. If so, the method 700 flows to block 715 and the access controller grants the request if it is a read request and denies the request if it is a write (or modify) request. In some embodiments, denying the request includes issuing a memory access fault. If the request is not directed to the instruction region, the method 700 flows to decision block 720.

At decision block 720, the access controller determines whether the request is directed to an address that is in a data region that is configured for read-write access by the microcontroller. If so, the method 700 flows to block 725 and the access controller grants either read or write accesses. If not and the access controller determines that the request is directed to an address that is outside both the instruction region and the data region of the TMR, the method 700 flows to block 730 and the access controller issues a memory access fault.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at an access controller from a microcontroller that supports a virtual function, a request to access a trusted memory region (TMR) that stores microcode used to execute the microcontroller in a first region and data associated with the microcontroller in a second region, wherein the second region is configured to be modifiable by the microcode; and
selectively providing the microcontroller with access to the TMR based on whether the request is to write in the first region.

2. The method of claim 1, wherein selectively providing the microcontroller with access to the TMR comprises granting a read request from the microcontroller to read from the first region.

3. The method of claim 1, wherein selectively providing the microcontroller with access to the TMR comprises denying a write request from the microcontroller to write to the first region.

4. The method of claim 1, wherein selectively providing the microcontroller with access to the TMR comprises granting requests from the microcontroller to read from the second region or write to the second region.

5. The method of claim 1, wherein receiving the request to access the TMR comprises receiving a request including a flag and metadata that indicates whether the request is serviced using the first region or the second region.

6. The method of claim 1, further comprising:
receiving, at the access controller from a secure processor that has a trusted relationship with the TMR, configuration information indicating that the microcontroller has read-only access to the first region that is allocated to store the microcode and the microcontroller has read-write access to the second region that is allocated to store the data.

7. The method of claim 6, wherein the configuration information comprises information indicating at least one of a start address, an end address, or an address range of the first region and a start address, an end address, or an address range of the second region.

8. The method of claim 7, further comprising:
configuring the access controller to selectively provide the microcontroller with access to the TMR based on the configuration information.

9. A method comprising:
receiving, at a first processor that has a trust relationship with a trusted memory region (TMR), a request to load first microcode used to execute a microcontroller that supports a first virtual function that executes on a second processor;
allocating, at the first processor, a first region in the TMR to store the first microcode and a second region in the TMR to store first data associated with the first virtual function, wherein the second region is configured to be modifiable by the first microcode; and
transmitting, from the first processor, configuration information used to configure an access controller to selectively provide the microcontroller with access to the TMR based on whether the request is to write in the first region.

10. The method of claim 9, wherein receiving the request to load the first microcode comprises receiving the request in response to launching a virtual machine associated with the first virtual function.

11. The method of claim 9, wherein the microcontroller supports a second virtual function using second microcode stored in the first region, and wherein the second region is configured to store second data associated with the second virtual function.

12. The method of claim 11, wherein transmitting the configuration information comprises transmitting the configuration information used to provide the microcontroller with read-only access to the first region and read-write access to the second region.

13. The method of claim 9, further comprising:
authenticating the first microcode; and
allocating the first region to store the first microcode in response to successfully authenticating the first microcode.

14. The method of claim 9, wherein the configuration information comprises information indicating at least one of a start address, an end address, or an address range of the first region and a start address, an end address, or an address range of the second region.

15. An apparatus comprising:
a first processor that has a trusted relationship with a trusted memory region (TMR) comprising a first region for storing microcode used to execute a microcontroller on a second processor and a second region for storing data associated with the microcontroller and configured to be modifiable by the microcode, wherein the microcontroller supports a virtual function; and
an access controller configured by the first processor to selectively provide the microcontroller with access to the TMR in response to a request from the microcontroller based on whether the request is to write in the first region.

16. The apparatus of claim 15, wherein the first processor is configured to provide configuration information indicating that the microcontroller has read-only access to the first region that is allocated to store the microcode and the microcontroller has read-write access to the second region that is allocated to store the data.

17. The apparatus of claim 16, wherein the access controller is configured to grant a read request from the microcontroller to read from the first region and deny a write request from the microcontroller to write to the first region.

18. The apparatus of claim 15, wherein the access controller is configured to grant requests from the microcontroller to read from the second region or write to the second region.

19. The apparatus of claim 15, wherein the first processor is configured to receive a request to load the microcode in response to the second processor launching the virtual function.

20. The apparatus of claim 19, wherein the first processor is configured to authenticate the microcode, and wherein the first processor is configured to load the microcode in the first region in response to successfully authenticating the microcode.

\* \* \* \* \*